(12) United States Patent
Rudenstam et al.

(10) Patent No.: US 12,330,284 B2
(45) Date of Patent: Jun. 17, 2025

(54) HAND-HELD ELECTRICALLY POWERED DEVICE

(71) Applicant: HUSQVARNA AB, Huskvarna (SE)

(72) Inventors: Carl Rudenstam, Jönköping (SE); Adam Fransson, Tenhult (SE); Ulrik Gejervall, Forserum (SE); Andreas Steen, Nässjö (SE)

(73) Assignee: HUSQVARNA AB, Huskvarna (SE)

(*) Notice: Subject to any disclaimer, the term of this patent is extended or adjusted under 35 U.S.C. 154(b) by 300 days.

(21) Appl. No.: 17/617,744

(22) PCT Filed: Apr. 28, 2020

(86) PCT No.: PCT/EP2020/061661
§ 371 (c)(1),
(2) Date: Dec. 9, 2021

(87) PCT Pub. No.: WO2020/225012
PCT Pub. Date: Nov. 12, 2020

(65) Prior Publication Data
US 2022/0241952 A1 Aug. 4, 2022

(30) Foreign Application Priority Data
May 3, 2019 (SE) .................................. 1950525-4

(51) Int. Cl.
*B25F 5/00* (2006.01)
*A01D 34/90* (2006.01)
(Continued)

(52) U.S. Cl.
CPC .............. *B25F 5/008* (2013.01); *H02K 5/02* (2013.01); *H02K 5/207* (2021.01); *H02K 9/06* (2013.01)

(58) Field of Classification Search
CPC .......... B25F 5/008; B25F 5/02; H02K 5/207; H02K 5/02; H02K 9/06; A01D 34/90; A01D 34/37; A01D 34/58
(Continued)

(56) References Cited

U.S. PATENT DOCUMENTS 2,604,501 A * 7/1952 Wightman ............... H02K 9/06
417/423.1
3,368,746 A 2/1968 Zelinski
(Continued)

FOREIGN PATENT DOCUMENTS

| CN | 201474972 U | 5/2010 |
|---|---|---|
| CN | 102470525 A | 5/2012 |

(Continued)

OTHER PUBLICATIONS

International Search Report and Written Opinion for International Application No. PCT/EP2020/061661 mailed Aug. 5, 2020.
(Continued)

*Primary Examiner* — Burton S Mullins
(74) *Attorney, Agent, or Firm* — BURR & FORMAN LLP (57) ABSTRACT

Herein a hand-held electrically powered device (2) is disclosed. The hand-held device comprises a housing (4)), an electric motor (14), and a fan (18). The hand-held device (2) comprises a wall member (20) arranged inside the housing (4) and forming at least part of a wall (22) which delimits a first compartment (24) from a second compartment (26) within the housing (4). The wall member (20) forms an individual element. The wall member (20) is coupled to first and second housing elements. The wall member (20) comprises a through opening (42). The electric motor (14) extends from the first compartment (24) to the second
(Continued)

compartment (26) via the through opening (42). The electric motor (14) is supported by the wall member (20).

14 Claims, 4 Drawing Sheets (51) Int. Cl.
  *B25F 5/02* (2006.01)
  *H02K 5/02* (2006.01)
  *H02K 5/04* (2006.01)
  *H02K 5/20* (2006.01)
  *H02K 9/06* (2006.01)

(58) Field of Classification Search
  USPC .................. 310/58, 91, 50; 417/423.15
  See application file for complete search history.

(56) References Cited

U.S. PATENT DOCUMENTS

| | | | | |
|---|---|---|---|---|
| 4,342,929 | A * | 8/1982 | Horne | H02K 5/148 |
| | | | | 310/43 |
| 4,531,700 | A * | 7/1985 | Robinson | B41J 29/02 |
| | | | | 310/91 |
| 5,311,089 | A * | 5/1994 | Stroetgen | H02K 9/06 |
| | | | | 310/58 |
| 5,544,417 | A * | 8/1996 | Atos | A01D 34/4165 |
| | | | | 29/469 |
| 5,563,461 | A * | 10/1996 | Daniels | H02K 9/06 |
| | | | | 310/58 |
| 6,894,409 | B2 * | 5/2005 | Bostwick | H02K 9/06 |
| | | | | 310/58 |
| 7,037,084 | B2 | 5/2006 | King | |
| 7,152,695 | B2 * | 12/2006 | Happ | B25F 5/006 |
| | | | | 173/217 |
| 7,157,818 | B2 * | 1/2007 | Jones | H02K 9/06 |
| | | | | 310/60 R |
| 7,252,581 | B2 * | 8/2007 | Numata | B25F 5/02 |
| | | | | 15/230.1 |
| 7,988,538 | B2 * | 8/2011 | Trautner | H02K 9/06 |
| | | | | 451/344 |
| 8,348,727 | B2 * | 1/2013 | Trautner | B24B 41/007 |
| | | | | 451/344 |
| 8,760,013 | B2 | 6/2014 | Esenwein | |
| 9,843,240 | B2 | 12/2017 | Hillenbrand | |
| 9,954,418 | B2 | 4/2018 | Kawakami et al. | |
| 2004/0216907 | A1 | 11/2004 | Happ et al. | |
| 2006/0110267 | A1 | 5/2006 | Tsai | |
| 2009/0280732 | A1 | 11/2009 | Esenwein | |
| 2016/0108929 | A1 | 4/2016 | Su | |
| 2017/0239804 | A1 | 8/2017 | Matsushita et al. | |
| 2017/0246735 | A1 | 8/2017 | Hashimoto et al. | |
| 2017/0274520 | A1 | 9/2017 | Christophersen et al. | |
| 2018/0117728 | A1 | 5/2018 | Kawakami et al. | |
| 2019/0039228 | A1 * | 2/2019 | Matsushita | B25F 5/00 |
| 2020/0346335 | A1 * | 11/2020 | Yang | B25F 3/00 |

FOREIGN PATENT DOCUMENTS

| | | | | |
|---|---|---|---|---|
| CN | 103104796 | A | 5/2013 | |
| CN | 204103666 | U | 1/2015 | |
| CN | 106611933 | A | 5/2017 | |
| DE | 3942083 | * | 6/1991 | ............ H02K 9/06 |
| DE | 102007043916 | A1 | 4/2009 | |
| DE | 102015104905 | A1 | 10/2016 | |
| EP | 0363815 | A1 * | 4/1990 | ............ H02K 5/10 |
| EP | 1622244 | A1 | 2/2006 | |
| EP | 1752259 | A1 | 2/2007 | |
| EP | 2202443 | A1 | 6/2010 | |
| EP | 2535150 | A2 | 12/2012 | |
| EP | 2712712 | A2 | 4/2014 | |
| EP | 3053709 | A1 | 8/2016 | |
| GB | 211192 | * | 6/1983 | ............ B08B 15/04 |
| JP | 2010274392 | A | 12/2010 | |
| JP | 5271517 | B2 | 8/2013 | |
| WO | 2004016399 | A1 | 2/2004 | |
| WO | 2017208711 | A1 | 12/2017 | |

OTHER PUBLICATIONS

Swedish Office Action and Search Report for Swedish Application No. 1950525-4 mailed on Dec. 18, 2019.

\* cited by examiner

HAND-HELD ELECTRICALLY POWERED DEVICE

TECHNICAL FIELD

The invention relates to a hand-held electrically powered device.

BACKGROUND

A hand-held electrically powered device is a power tool configured to be operated by a user. The hand-held electrically powered device comprises a tool which is driven by an electric motor. The electric motor is arranged and supported in a housing of the hand-held electrically powered device. The hand-held electrically powered device may be used outdoors for one or more different tasks. It may be used e.g. in a domestic garden, a park, or in public open spaces.

SUMMARY

It is an object of the invention to provide a hand-held electrically powered device wherein an electric motor is reliable supported.

According to an aspect of the invention, the object is achieved by a hand-held electrically powered device comprising a housing, a tool, an electric motor provided with a rotatable motor shaft, and a fan. The electric motor is arranged inside the housing and is configured to drive the tool. The fan is connected to the motor shaft and arranged to produce an airflow for cooling the electric motor. The housing comprises a number of housing elements, the housing elements being interconnected and forming an outer surface of the housing. The hand-held electrically powered device comprises a wall member arranged inside the housing and forming at least part of a wall which delimits a first compartment from a second compartment within the housing, wherein the wall member forms an individual element, wherein the wall member is coupled to a first housing element and to a second housing element of the housing elements, wherein the wall member comprises a through opening, wherein the electric motor extends from the first compartment to the second compartment via the through opening, and wherein the electric motor is supported by the wall member.

Since the wall member forms an individual element which is coupled to the first and second housing elements, since the electric motor extends from the first compartment to the second compartment via the through opening, and since the electric motor is supported by the wall member, the electric motor is supported in the housing of the hand-held electrically powered device via the wall member. As a result, the above mentioned object is achieved.

Moreover, since the electric motor extends from the first compartment to the second compartment via the through opening, the electric motor may be supported by the wall member at a favourable axial position along the electric motor, e.g. at a distance from one end of the electric motor. Further, since the wall member forms an individual element, provisions are made for decupling the wall member from the housing, thus, limiting transmission of vibrations from the electric motor to the housing.

The hand-held electrically powered device is a power tool configured to be operated by a user. Herein, the hand-held electrically powered device may alternatively be referred to as a hand-held device. The hand-held electrically powered device may be used outdoors for one or more different tasks. That is, the hand-held device may be configured to be provided with one tool only. Alternatively, the tool may be exchangeable such that different tasks may be performed with the hand-held device. The hand-held device may be used e.g. in a domestic garden, a park, or a public open space.

The hand-held device may comprise one or two hand grips for grasping by a user. The hand-held device may be attachable to a harness carried by the user. Thus, the entire weight of the hand-held cutting device does not have to be supported by the hands and arms of the user.

The tool may be e.g. a rotating tool, such as e.g. a cutting string, a sawblade, or a brush. Alternatively, the tool may be a reciprocating tool, such as e.g. a hedge trimmer, or a pair of shears. The hand-held device may comprise a shaft portion extending between the housing and the tool.

According to embodiments, the wall member may comprise at least one air passage opening, the at least one air passage opening being arranged adjacent to the electric motor. In this manner, the airflow produced by the fan may be directed to pass close to the electric motor as the airflow passes through the at least one air passage opening from the first compartment to the second compartment, or vice versa. Thus, cooling of the electric motor may be ensured.

More specifically, the electric motor requires cooling. By arranging the at least one air passage opening adjacent to the electric motor, the airflow produced by the fan will pass close to an outer surface of the electric motor, thus, cooling the electric motor.

The fan may be arranged in the second compartment. The fan may be configured to draw an airflow from the first compartment into the second compartment, via the at least one air passage opening.

According to embodiments, the fan may extend radially to the air passage opening and may span at least partially radially across the at least one air passage opening. In this manner, the airflow produced by the fan may be drawn, or pushed, through the at least one air passage opening.

Extending radially means that blades of the fan extends in a direction radially outwardly from the motor shaft and an axis of rotation of the motor shaft.

According to embodiments, the at least one air passage opening has a longitudinal extension in parallel with the motor shaft. A cross sectional area of the at least one air passage opening is larger at an inlet end than at an outlet end of the at least one air passage opening. In this manner, the at least one air passage opening may have a funnel shaped cross sectional shape. Such a funnel shaped cross-section may ensure that the airflow directly upstream of the fan is not subjected to any pressure drop. An upstream pressure drop would reduce the airflow through the at least one air passage opening. Accordingly, the funnel shaped cross-section may ensure reliable airflow from the first compartment into the second compartment.

In embodiments wherein the fan is arranged at the outlet end of the at least one air passage opening, the funnel shaped cross sectional shape may ensure reliable airflow from the first compartment into the second compartment, as discussed above. Arranged at the at least one air passage opening, the fan ensures that air is drawn from the first compartment via the at least one air passage opening thus, cooling an outside of the electric motor.

According to embodiments, a cooling air path may be formed within the housing from the first compartment through the electric motor and the at least one air passage opening into the second compartment. In this manner, the airflow produced by the fan and following the cooling air path may ensure a reliable cooling of the electric motor.

According to embodiments, the housing may comprise at least one air intake opening leading into the first compartment. In this manner, air may be drawn through the at least one air intake opening for producing the airflow for cooling the electric motor. Put differently, the airflow produced by the fan may be drawn from an ambient environment of the hand-held device through the at least one air intake opening into the first compartment and into the second compartment via the at least one air passenger opening and/or the electric motor.

According to embodiments, the electric motor may be supported by the wall member via a snap fit connection between the wall member and the electric motor. In this manner, the electric motor may be easily connected to, and supported by, the wall member.

According to embodiments, the hand-held electrically powered device may comprise a first resilient element and a second resilient element. The wall member may be coupled to the first housing element via the first resilient element, and the wall member may be coupled to the second housing element via the second resilient element. In this manner, the wall member may be coupled to the first and second housing elements in a manner which may eliminate, or at least reduce, transfer of vibrations from the electric motor and/or the tool to the housing.

According to embodiments, the wall member may be only indirectly connected to the housing, via the first and second resilient elements and optionally via further resilient elements. In this manner, coupling of the wall member to the housing of the hand-held device may be achieved in a manner which may eliminate, or at least reduce, transfer of vibrations from the electric motor and/or the tool to the housing.

According to embodiments, at least one cable may extend to the electric motor. The wall member may comprise a cable holder configured for guiding the at least one cable along the wall member, and the at least one cable may extend through the cable holder. In this manner, the at least one cable may be drawn in a secure manner along the wall member to the electric motor.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figures 1A, 1B:
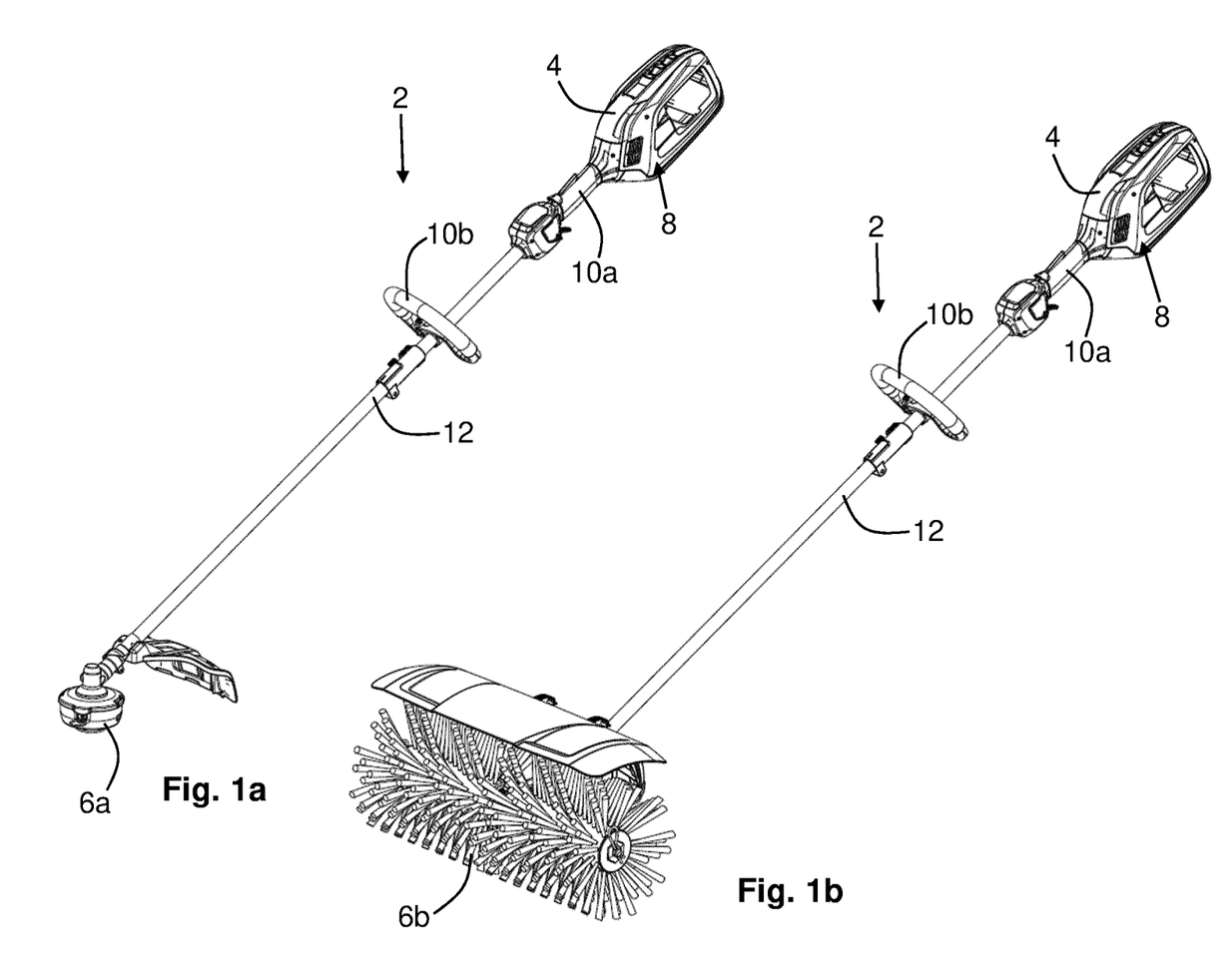
FIGS. 1a and 1b illustrate a hand-held electrically powered device according to embodiments.

FIGS. 1a and 1b illustrate a hand-held electrically powered device 2 according to embodiments.

The hand-held device 2 comprises a housing 4, a tool 6a, 6b and an electric motor. The electric motor is arranged inside the housing 4 and is configured to drive the tool 6a, 6b. The housing 4 comprises a number of housing elements. The housing elements are interconnected and form an outer surface 8 of the housing 4.

The electric motor may be battery powered. In such embodiments, a rechargeable electrical battery may be arranged in the housing 4 or may be carried in a backpack by a user of the hand-held device 2. Alternatively, the electric motor may be connected to mains electric power via an electrical power cord.

In these embodiments, the hand-held device 2 is configured for use with exchangeable tools 6a, 6b. In FIG. 1a a cutting tool 6a comprising a cutting string is shown connected to the hand-held device 2. In FIG. 1b a tool 6b in the form of a brush is shown connected to the hand-held device 2. Alternatively, other types of rotating or reciprocating tools may be connected to the hand-held device 2.

According to alternative embodiments, the hand-held device 2 may be configured to be used with one tool only. That is, the hand-held device 2 may not be configured for exchange of the tool.

In these embodiments, the hand-held device 2 comprises two hand grips 10a, 10b for grasping by a user of the hand-held device 2. In connection with one or both hand grips 10a, 10b there may be arranged control means for starting and stopping the electric motor, and thus, operation of the tool 6a, 6b.

In alternative embodiments, the hand-held device 2 may comprise only one hand grip, such as the hand grip 10a.

In these embodiments, the hand-held device 2 comprises a shaft portion 12 extending between the housing 4 and the tool 6a, 6b. The shaft portion 12 may comprise, one component only, or two or more components connected to each other.

According to alternative embodiments, the tool may be arranged directly in connection with the housing 4, i.e. the hand-held device 2 does not comprise any shaft portion.

Figure 2A:
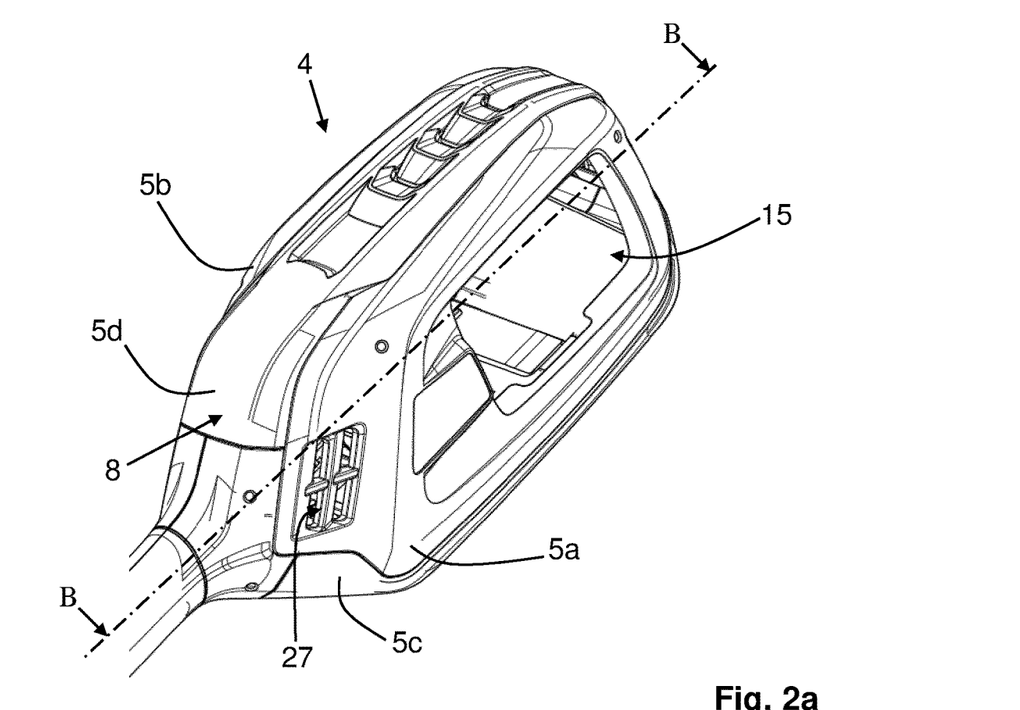
FIGS. 2a and 2b illustrate embodiments of a housing of a hand-held electrically powered device.
Figure 2B:
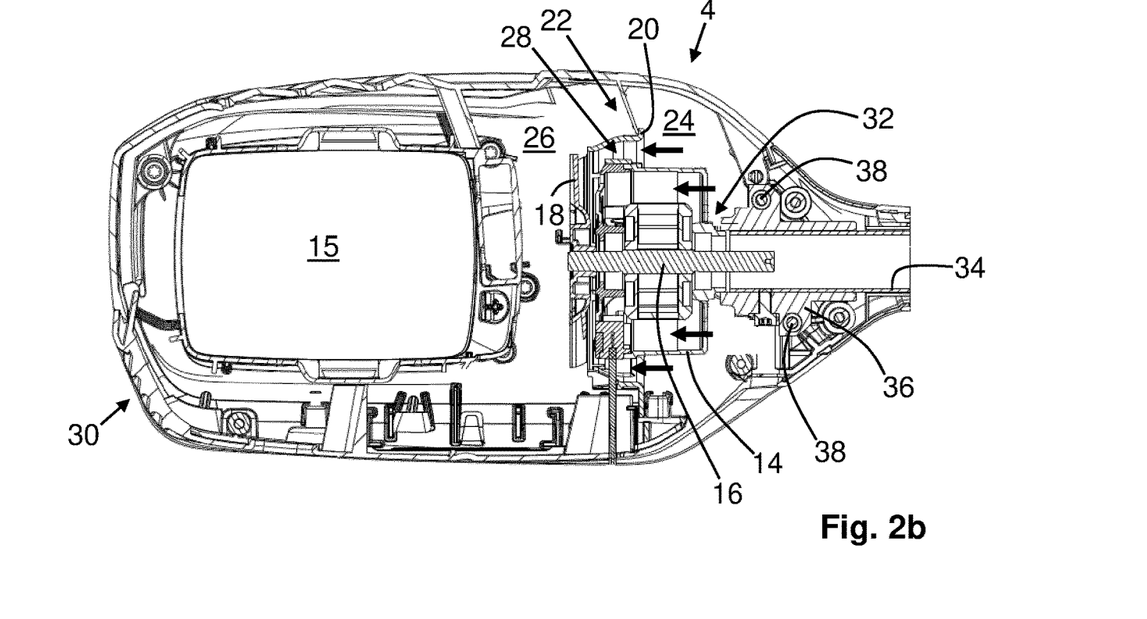

FIGS. 2a and 2b illustrate embodiments of a housing 4 of a hand-held electrically powered device, such as the hand-held device 2 shown in FIGS. 1a and 1b. FIG. 2a shows an external view of the housing 4. FIG. 2b shows a cross section of the housing 4 along line B-B in FIG. 2a.

As mentioned above, the hand-held device comprises the housing 4 and an electric motor 14. In these embodiments, the electric motor 14 is battery powered. Accordingly, the housing 4 is provided with a battery receiving opening 15. The battery receiving opening 15 is configured for receiving therein a rechargeable battery (not shown).

The electric motor 14 is provided with a rotatable motor shaft 16, and a fan 18. The fan 18 is connected to the motor shaft 16 and arranged to produce an airflow for cooling the electric motor 14. That is, when electric power is supplied to the electric motor 14, the motor shaft 16 will rotate. The rotation of the motor shaft 16 rotates the fan 18, which in turn produces the airflow. The motor shaft 16 is connected to the tool of the hand-held device. Thus, the rotation of the motor shaft 16 also drives the tool of the hand-held device. Accordingly, the electric motor 14 is configured to drive the tool.

According to some embodiments, the fan 18 may be directly connected to the motor shaft 16. In this manner, the fan 18 may be arranged close to the electric motor 14, which ensures that the airflow will flow along the electric motor 14, thus, cooling it.

The housing 4 comprises a number of housing elements 5a, 5b, 5c, 5d. The housing elements 5a, 5b, 5c, 5d are interconnected and form an outer surface 8 of the housing 4. The housing 4 comprises at least two housing elements. In these embodiments, the housing 4 comprises four housing elements 5a, 5b, 5c, 5d. However, the housing 4 may alternatively comprise more or less than four housing elements.

The hand-held device comprises a wall member 20 arranged inside the housing 4. The wall member 20 forms at least part of a wall 22, which delimits a first compartment 24 from a second compartment 26 within the housing 4. That is, the wall member 20 may form the entire wall 22 which delimits the first compartment 24 from the second compartment 26. Alternatively, the wall member 20 together with further wall elements, such as wall elements formed integrally with the housing elements, may form the wall 22 which delimits the first compartment 24 from the second compartment 26. The latter is the case in the embodiments shown in FIG. 2b.

The wall member 20 forms an individual element. That is, the wall member 20 forms a separate element within the housing 4. The wall member 20 does not form an integral part of any of the housing elements. Instead, the wall member 20 is coupled to a first housing element 5a and to a second housing element 5b of the housing elements.

The wall member 20 comprises a through opening. The electric motor 14 extends from the first compartment 24 to the second compartment 26 via the through opening. The electric motor 14 is supported by the wall member 20.

The wall member 20 is discussed in further detail below with reference to FIGS. 3a-4b.

The wall member 20, its coupling to the housing elements, and the arrangement of the electric motor at 14 extending through the through opening are discussed in further detail below with reference to FIGS. 3c-4b.

The arrangement of the electric motor 14 extending through the through opening of the wall member 20 provides for the electric motor 14 to be reliably supported within the housing 4. Moreover, since the wall member 20 forms an individual element which is coupled to the first and second housing elements 5a, 5b, conditions are provided for eliminating, or at least reducing, transfer of vibrations from the electric motor at 14 via the wall member 20 to the first and second housing elements 5a, 5b.

The wall member 20 comprises at least one air passage opening 28. The at least one air passage opening 28 is arranged adjacent to the electric motor 14. Thus, the airflow produced by the fan 18 is drawn through the at least one air passage opening 28 close to the electric motor 14. Cooling of an outer surface of the electric motor 14 may thus, be provided by the airflow produced by the fan 18.

In these embodiments, the fan 18 is arranged in the second compartment 26. The fan 18 is configured to draw the airflow from the first compartment 24 into the second compartment 26.

The at least one air passage opening 28 has a longitudinal extension in parallel with the motor shaft 16. A cross sectional area of the at least one air passage opening 28 is larger at an inlet end than at an outlet end of the at least one air passage opening 28. The cross-sectional area extends along the longitudinal extension in parallel with the motor shaft 16. A funnel shaped cross sectional shape of the at least one air passage opening 28 is provided in this manner. The funnel shaped cross-sectional area ensures a reliable airflow through the at least one air passage opening 28 by preventing an upstream pressure drop in the at least one air passage opening 28.

In these embodiments, the inlet end of the air passage opening 28 is arranged at the first compartment 24. The outlet end of the air passage opening 28 is arranged at the second compartment 26 and the fan 18.

The housing 4 comprises at least one air intake opening 27 leading into the first compartment 24. Thus, the fan 18 may draw air through the at least one air intake opening 27 for producing the airflow for cooling the electric motor 14. The airflow is drawn from an ambient environment of the hand-held device through the at least one air intake opening 27 into the first compartment 24 and into the second compartment 26 at least via the air passage opening 28.

Suitably, the housing 4 may comprise at least one air outlet opening 30. Directly or indirectly from the second compartment 26, the airflow flows out into the ambient environment via the at least one air outlet opening 30.

A cooling air path is formed within the housing 4, from the first compartment 24 through the electric motor 14 and the at least one air passage opening 28 into the second compartment 26. The cooling air path is indicated in FIG. 2b with four arrows pointing from the first compartment 24 towards the second compartment 26. Thus, the airflow produced by the fan 18 and following the cooling air path ensures both an external and an internal cooling of the electric motor 14. Thus, the electric motor 14 is reliably cooled.

According to some embodiments, the cooling air path may comprise the at least one air intake opening 27 and the at least one air outlet opening 30. In such embodiments, the cooling air path extends from the at least one air intake opening 27, via the first compartment 24, through the electric motor at 14 and the at least one air passage opening 28, via the second compartment 26, and to the at least one air outlet opening 30.

The hand-held device may comprise a driving shaft 34. The driving shaft 34 is connected to the motor shaft 16 and extends from the motor shaft 16 to the tool. A rotation of the driving shaft 34 is transferred to a rotating or reciprocating motion of the tool. In this manner, the tool of the hand-held device may be driven by the electric motor 14. The driving shaft 34 being connected to the motor shaft 16 means that the rotation of the motor shaft 16 is transferable to the driving shaft 34.

More specifically, the driving shaft 34 may extend through the shaft portion 12 to the tool 6a, 6b, see also FIGS. 1a, 1b. The shaft portion 12 may for instance comprise a tube, through which the driving shaft 34 extends. The driving shaft may be journaled in the shaft portion 12. In a known manner, the hand-held device 2 may comprise a transmission at the tool 6a, 6b configured to transfer the rotation of the driving shaft 34 to suit the relevant tool of the hand-held device 2.

The electric motor 14 is connected to the housing 4 at an axial end portion 32 of the electric motor 14 at a distance from the wall member 20. In this manner, the electric motor 14 is supported not only at the wall member 20 but also at a distance therefrom. A secure support of the electric motor 14 thus, may be provided within the housing 4.

The axial end portion 32 of the electric motor 14 at a distance from the wall member 20 may be an axial end portion of the electric motor at 14 where the motor shaft 16 connects to the driving shaft 34 for driving the tool of the hand-held device. That is, the axial end portion 32 may be an axial end portion opposite to the axial end portion of the electric motor 14 where the fan 18 is connected to the motor shaft 16.

In the illustrated embodiments, the electric motor 14 is connected to the housing 4 at the axial end portion 32 of the electric motor 14 via a bracket 36.

The bracket 36 may also form a support and/or journaling of the driving shaft 34. In this manner, alignment between the motor shaft 16 and the driving shaft 34 may be ensured. In the illustrated embodiments, the bracket 36 is bolted to the housing 4 via two screws 38.

Figure 3A:
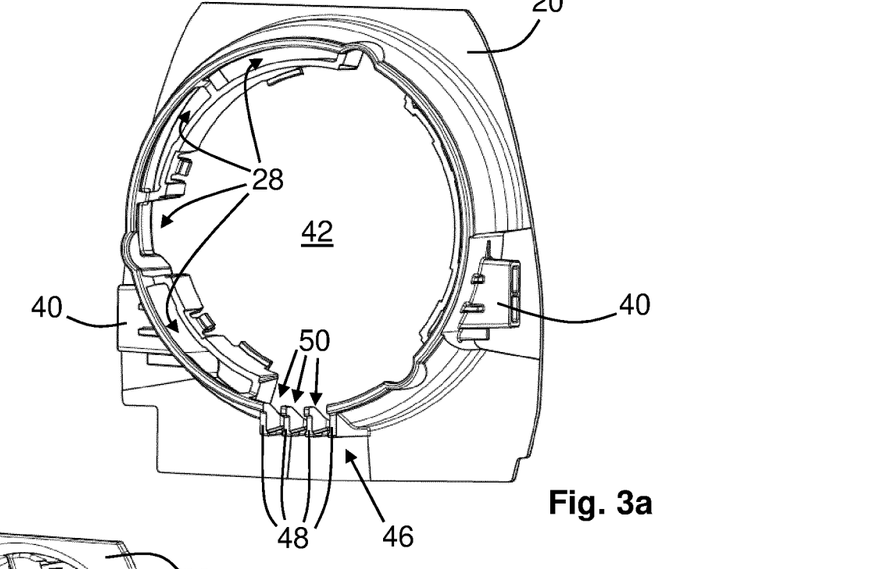
FIGS. 3a-3c illustrate embodiments of a wall member of a hand-held device.
Figure 3B:
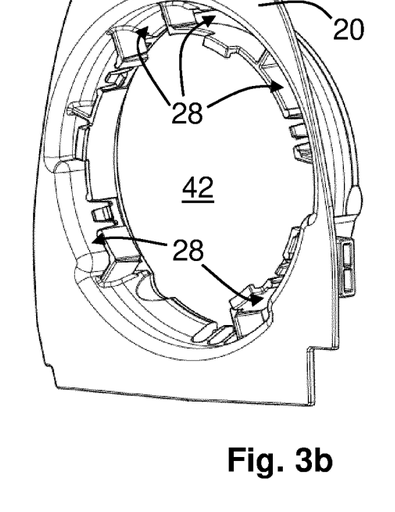
Figure 3C:
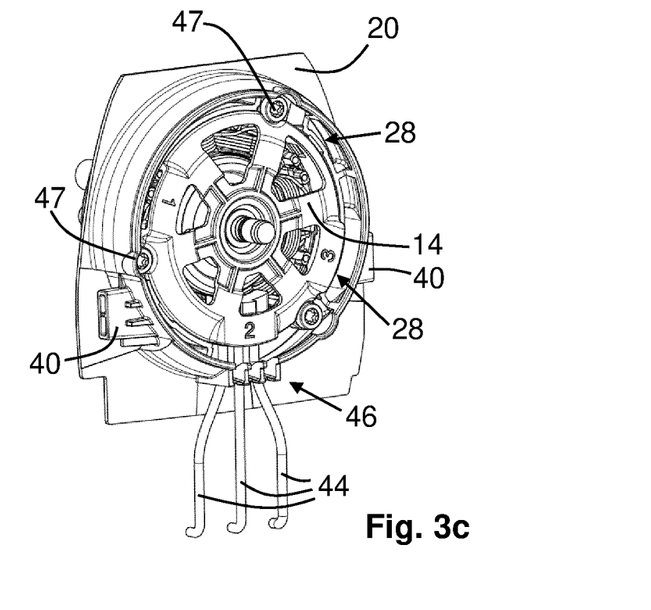
Figure 4A:
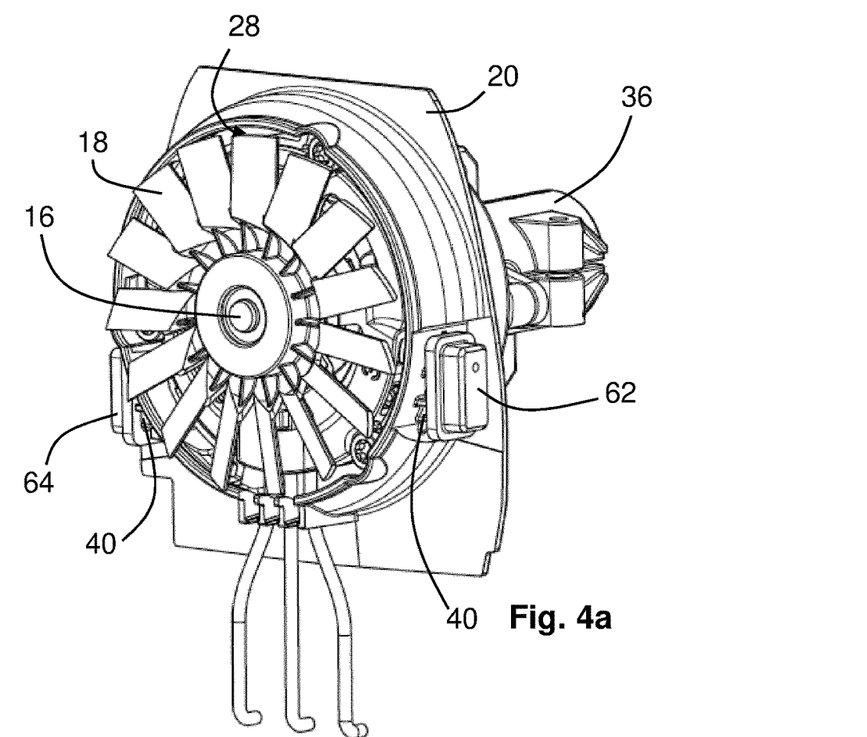
FIGS. 4a and 4b illustrate a wall member and an electric motor of a hand-held device.

FIGS. 3a-3c illustrate embodiments of a wall member 20 of a hand-held device. FIGS. 3a and 3b show two different views of the wall member 20. FIG. 3c shows the wall member 20 with an electric motor 14 of the hand-held device mounted therein. The wall member 20 may be a wall member 20 as discussed above in connection with FIGS. 2a and 2b.

The wall member 20 is configured to form at least part of a wall 22, which delimits first and second compartments within a housing of the hand-held device. The wall member 20 forms an individual element. As such, the wall member 20 is connectable within the housing. Thus, the wall member 20 is configured to be coupled to at least one housing element of the housing of the hand-held device.

In these embodiments, the wall member 20 comprises two stubs 40 configured for coupling the wall member 20 to the housing elements of the housing of the hand-held device, see further below with reference to FIGS. 4a and 4b.

As discussed above, the wall member 20 comprises a through opening 42. The through opening 42 is configured for the electric motor 14 to extend there through, see above with reference to FIG. 2b and below with reference to FIGS. 4a and 4b.

As discussed above, the wall member 20 comprises at least one air passage opening 28. In these embodiments, the wall member 20 comprises more than four air passage openings 28. The air passage openings 28 are provided in connection with the through hole 42. The air passage openings 28 are thus arranged adjacent to the electric motor 14 when it is mounted in the through hole 42. Thus, an airflow may pass through the air passage openings 28 for cooling the electric motor 14.

Some of the air passage openings 28 are formed by the material of the wall member 20. One or more of the air passage openings 28 may be formed between the electric motor 14 and the wall member 20.

As shown in FIG. 3c, the electric motor 14 may have an open structure which permits air to flow there through. Thus, as discussed above, a cooling air path may extend through the electric motor 14 and the at least one air passage opening 28. Thus, the airflow ensures both an internal and an external cooling of the electric motor 14.

At least one cable 44 extends to the electric motor 14. The wall member 20 comprises a cable holder 46 configured for guiding the at least one cable 44 along the wall member 20. The at least one cable 44 extends through the cable holder 46. Thus, the at least one cable 44 is directed securely along the wall member 20 to/from the electric motor 14 without danger of entangling with the fan (not shown).

According to embodiments, the cable holder 46 may comprise at least two protrusions 48 forming therebetween at least one slot 50. The at least one cable 44 is frictionally engaged between the at least two protrusions 48 in the at least one slot 50. In this manner, the at least one cable 44 may be secured in the cable holder 46.

More specifically, in these embodiments, there are provided three cables 44. The cable holder 46 comprises four protrusions 48. Between the four protrusions 48 there are formed three slots 50, one slot for each cable 44. Each of the three cables 44 is frictionally engaged with the two protrusions 48 forming one slot 50.

Figure 4B:
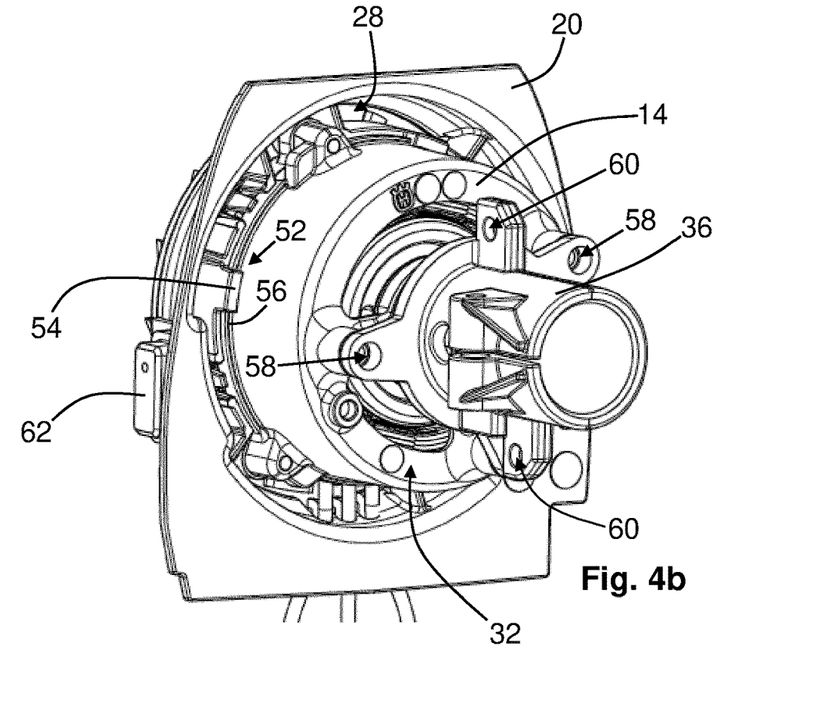

FIGS. 4a and 4b illustrate the wall member 20 and the electric motor 14 of FIGS. 3a-3c. Thus, the wall member 20 may be a wall member 20 as discussed above in connection with FIGS. 2a and 2b. FIGS. 4a and 4d show two different views of the wall member 20.

As mentioned above, the electric motor 14 is provided with a rotatable motor shaft 16, and a fan 18. The fan 18 is connected to the motor shaft 16 and arranged to produce an airflow for cooling the electric motor 14. The electric motor 14 extends through the through opening of the wall member 20. The electric motor 14 is supported in the through hole by the wall member 20. The wall member 20 comprises at least one air passage opening 28 adjacent to the electric motor 14.

The electric motor 14 is supported by the wall member 20 via a snap fit connection 52 between the wall member 20 and the electric motor 14. This is an easy manner of connecting the electric motor 14 to the wall member 20 during assembling of the hand-held device.

The snap fit connection 52 may comprise at least one protrusion 54 and at least one recess 56. The at least one protrusion 54 is provided in the wall member 20. The at least one protrusion 54 is flexible in a radial direction of the through hole and the motor shaft 16. The at least one recess 56 is provided in the electric motor 14. The at least one protrusion 54 and the at least one recess 56 are arranged in a radial position in relation to the through hole and the motor shaft 16 such that the at least one protrusion 54 engages with the at least one recess 56 when the electric motor 14 extends through the through hole.

In FIG. 4b only one snap fit connection 52 is indicated. However, the electric motor 14 may be supported by the wall member 20 via further snap fit connections between the wall member 20 and the electric motor 14.

According to alternative embodiments, the electric motor may be supported by the wall member via a screw connection between the wall member and the electric motor, as indicated by the motor screws 47 shown in FIG. 3c.

The fan 18 extends radially to the air passage opening 28 and spans at least partially radially across the at least one air passage opening 28. Thus, the fan 18 is arranged to draw air through the at least one air passage opening 28.

In FIGS. 4a and 4b the bracket 36 is shown. The bracket 36 is configured for connecting the electric motor 14 to the housing of the hand-held device, at an axial end portion 32 of the electric motor 14 at a distance from the wall member 20.

In these embodiments, the bracket 36 is configured to be bolted to the electric motor 14. For this purpose, the bracket 36 is provided with two holes 58, through which screws may extend and engage with threaded holes in the electric motor 14. The bracket 36 is further configured to be bolted to the housing of the hand-held device. For this purpose, the bracket 36 is provided with further holes 60. Through the further holes 60 screws may extend and engage with housing elements of the housing, se also above with reference to FIG. 2b and the screws 38.

The wall member at 20 is configured to be coupled to one or more housing elements of the housing of the hand-held device.

The hand-held electrically powered device comprises a first resilient element 62 and a second resilient element 64.

The wall member 20 is configured to be coupled to a first housing element via the first resilient element 62, and to a second housing element via the second resilient element 64.

In these embodiments, the wall member 20 comprises two stubs 40 configured for coupling the wall member 20 to the housing elements of the housing. The first and second resilient elements 62, 64 are attached to the stubs 40 as well as to the first and second housing elements. Thus, the wall member 20 is suspended via the first and second resilient elements 62, 64 in the housing. Accordingly, the wall member 20 is coupled to the first and second housing elements in a manner which eliminates, or at least reduce, transfer of vibrations from the electric motor 14 to the housing of the hand-held device.

In order to ensure elimination, or at least reduction, of the transfer of vibrations from the electric motor at 14 to the housing, no direct solid connections may be provided between the wall member 20 and the housing of the hand-held device. Thus, the wall member 20 may be only indirectly connected to the housing, via the first and second resilient elements 62, 64 and optionally via further resilient elements.

According to embodiments, the first and second resilient elements 62, 64 may be made from natural rubber, synthetic rubber, or a thermoplastic elastomer. In this manner, the wall member 20 may be elastically suspended in the housing of the hand-held device.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A hand-held electrically powered device comprising:
a housing comprising a plurality of housing elements forming a first compartment that comprises an air intake opening for air to enter the housing and a second compartment that comprises an air outlet opening for air to exit the housing;
a tool;
a motor shaft;
an electric motor arranged inside the housing and is configured to drive the tool by rotating the motor shaft;
a fan arranged to produce an airflow for cooling the electric motor; and
a wall member forming at least part of a wall that delimits a first compartment from a second compartment within the housing and limits a transfer of vibrations from the electric motor to the housing elements due to being a separate element from the housing elements;
wherein the wall member comprises a through opening that surrounds the electric motor which extends through the through opening and the through opening forms an air passage opening that extends from, and is a continuation of, the through opening such that airflow from the fan passes from the air intake opening into the first compartment through the air passage opening in the wall member and into the second compartment for exit via the air outlet opening to cool an external surface of the electric motor;
wherein the air passage opening has a funnel shaped cross section along a longitudinal extension that is parallel with the motor shaft such that the air passage opening is larger at an inlet end that is proximate the first compartment than at an outlet end of the air passage opening that is proximate the second compartment to support reliable airflow through the air passage opening by preventing an upstream pressure drop in the first compartment.

2. A hand-held electrically powered device comprising:
a housing;
a tool; and
an electric motor comprising a rotatable motor shaft and a fan;
wherein the electric motor is arranged inside the housing and is configured to drive the tool;
wherein the fan is connected to the motor shaft and arranged to produce an airflow for cooling the electric motor;
wherein the housing comprises housing elements interconnected to form an outer surface of the housing;
wherein the hand-held electrically powered device further comprises a wall member arranged inside the housing and forming at least part of a wall which delimits a first compartment from a second compartment within the housing;
wherein the wall member forms an individual element, separate from the housing elements, that limits transfer of vibrations from the electric motor to the housing elements due to being a separate element, the wall member comprising a through opening to encircle the electric motor and an air passage opening that extends from, and is a continuation of, the through opening such that airflow from the fan that passes through the air passage opening cools an external surface of the electric motor that is disposed within the through opening;
wherein the electric motor extends through the through opening of the wall member;
wherein the first compartment comprises an air intake opening for air to enter the housing and the second compartment comprises an air outlet opening for air to exit the housing; wherein the wall member comprises an the air passage opening, the air passage opening being arranged adjacent to the electric motor to permit air flow, created by the fan, from the air intake opening into the first compartment of the housing, through the air passage opening in the wall member, and into the second compartment for exit via the air outlet opening;
wherein the air passage opening has a longitudinal extension in parallel with the motor shaft; and
wherein a cross sectional area of the air passage opening is larger at an inlet end that is proximate the first compartment than at an outlet end of the air passage opening that is proximate the second compartment;
wherein the air passage opening has a funnel shaped cross section along a longitudinal extension that is parallel with the motor shaft to support reliable airflow through the air passage opening by preventing an upstream pressure drop in the first compartment.

3. The hand-held electrically powered device according to claim 2, wherein the fan extends radially to the air passage opening and spans at least partially radially across the air passage opening.

4. The hand-held electrically powered device according to claim 2, wherein the electric motor is supported by the wall member via a snap fit connection between the wall member and the electric motor.

5. The hand-held electrically powered device according to claim 2, wherein the electric motor is supported by the wall member via a screw connection between the wall member and the electric motor.

6. The hand-held electrically powered device according to claim 2 further comprising a plurality of resilient elements, the plurality of resilient elements comprising a first resilient element and a second resilient element;
- wherein the first resilient element is disposed between the wall member and a first housing element of the housing elements to limit the transfer of vibrations between the wall member and the first housing element;
- wherein the second resilient element is disposed between the wall member and a second housing element of the housing elements to limit the transfer of vibrations between the wall member and the second housing element;
- wherein the wall member is suspended within the housing due to the positioning of the first and second resilient elements between the wall member and the first and second housing elements, respectively;
- wherein the wall member is not otherwise connected to the first and second housing elements, except through the plurality of resilient elements.

7. The hand-held electrically powered device according to claim 6, wherein the first and second resilient elements are made from natural rubber, synthetic rubber, or a thermoplastic elastomer.

8. The hand-held electrically powered device according to claim 6, wherein the wall member is not in direct contact with the first housing element or the second housing element.

9. The hand-held electrically powered device according to claim 1, wherein a cable extends to the electric motor;
- wherein the wall member comprises a cable holder configured to guide the cable along the wall member; and
- wherein the cable extends through the cable holder between the first and second compartments.

10. The hand-held electrically powered device according to claim 9, wherein the cable holder comprises at least two protrusions forming therebetween at least one slot, and wherein the at least one cable is frictionally engaged between the at least two protrusions in the at least one slot.

11. The hand-held electrically powered device according to claim 1, wherein the electric motor is connected to the housing at an axial end portion of the electric motor at a distance from the wall member.

12. The hand-held electrically powered device according to claim 11, wherein the electric motor is connected to the housing at the axial end portion of the electric motor via a bracket.

13. The hand-held electrically powered device according to claim 1, wherein the fan is directly connected to the motor shaft.

14. The hand-held electrically powered device according to claim 1 further comprising a driving shaft;
- wherein the driving shaft is connected to the motor shaft and extends from the motor shaft to the tool, and wherein a rotation of the driving shaft is transferred to a rotating or reciprocating motion of the tool.

* * * * *